3,082,198
PROCESS FOR POLYMERIZING ETHYLENE IN THE PROCESS OF ALUMINUM ALKYL, TITANIUM TETRACHLORIDE, AND CARBOXYLIC ACID
John E. Klein, Cleveland, Ohio, assignor to Goodrich-Gulf Chemicals, Inc., Cleveland, Ohio, a corporation of Delaware
No Drawing. Filed Aug. 25, 1958, Ser. No. 757,138
5 Claims. (Cl. 260—94.9)

The present invention relates to an improved process for polymerizing a monomeric hydrocarbon material containing ethylene. More particularly, the invention relates to an improved solvent/non-solvent process of polymerizing ethylene wherein less difficulty with build-up of solid polymer on reaction vessel surfaces is experienced and wherein greater catalyst efficiency is achieved.

Recent advances in the polymerization art have provided new processes for the polymerization of ethylene which are carried out at low pressures and with the production of high density, substantially linear polyethylenes of highly valuable properties. Some of these processes utilize an organometallic catalyst. Such processes share a common problem with deposition of polymer on the walls and surfaces of the reaction vessel and associated equipment with a concomitant reduction in heat transfer coefficient. At times this may be so severe as to lead to plugging of accessory lines, valves, etc. The deposited polymer is difficult to remove since the resin is of low solubility in most solvent materials. This difficulty has led in some cases to the use of reaction vessels having interior surfaces of smooth, impervious materials to which the resin is not strongly adherent. Such coatings, however, are only partially successful in reducing build-up. The polymer build-up problem has hindered the development of successful commercial processes, especially those involving continuous or semi-continuous operation.

According to the present invention, the problem of polymer build-up, in any process involving the polymerization of ethylene with titanium/aluminum organometallic catalysts in a hydrocarbon diluent medium containing less than about 50 parts by weight of water per million parts by weight of said diluent, is brought under control by incorporating in such medium sufficient of a solvent-soluble carboxylic acid containing at least 2 carbon atoms as to yield 0.5 mole of COOH for every mole of water therein. Such an amount of acid seems to greatly reduce build-up and activates the catalyst, when operating with solvents containing less than about 50 parts/wt. of water per million (p.p.m.) of reaction medium or diluent.

When, however, the carboxylic acid is present in at least equimolar proportions to the water content (i.e. 1 mole of COOH per mole of water) when operating at lower water levels of 0 to 10 p.p.m. based on the hydrocarbon polymerization medium, polymer build-up is never severe permitting continuous, semi-continuous or even batch-wise operation for long periods without shut-down for reactor cleaning. Where the process results in a slurry of insoluble polymer such as polyethylene in a hydrocarbon diluent medium, still other advantages are derived from the use of the acid. In all cases the slurry viscosity is much lower permitting operation at higher solids levels and with better agitation and better heat transfer. With the titanium/aluminum organometallic catalysts, carboxylic acids seem to be mild activators and yield better catalyst efficiency (i.e. higher yields of polymer per pound of catalyst). Reaction vessels can be operated for hundreds of hours without fouling and such thin deposits as do develop are so easy to remove as to be loosened and floated away with a mere water wash.

With the titanium/aluminum organometallic catalysts, for example those made by combining an alkyl aluminum or alkyl aluminum halide with a titanium halide, the carboxylic acid is particularly valuable. In such processes the proportion of acid required for effective protection against polymer build-up not only has to be at least equimolar with the moisture content of the medium (i.e. at less than 50 p.p.m. of water on the diluent) but also roughly proportional to the catalyst concentration. That is, at low catalyst levels (i.e. from about 1 to about 5 millimoles per liter of reaction medium) satisfactory operation is obtained with molar proportions about equivalent to the water content of the medium while at higher catalyst levels (5, 10, 15 millimoles or more) the proportion of acid must be increased roughly by a corresponding amount (irrespective of water content). With the proper proportion of carboxylic acid the catalyst and reaction medium are much more tolerant of water and the course of reaction is much more predictable. Other than its mild accelerating action, the acid is without effect on the catalysts and the polymers produced.

The carboxylic acid, particularly when the latter is a higher fatty acid, can be present during the preparation of the catalyst; it can be added to the reaction mixture just before or just after reaction has begun; or it can be added at any time during the reaction. Whenever added, the acid eliminates film formation and polymer deposition, reduces the viscosity of the reaction mix and improves heat transfer characteristics. However, when the higher fatty acid is present during the preparation of the catalyst (in a concentrated form) and the catalyst is aged for about 1 to about 24 hours before use, the physical form and activity of the catalyst is modified. In those catalysts which normally develop an insoluble precipitate, the particle size of the precipitate is smaller. In all cases the catalyst is mildly activated and its efficiency increased (i.e. more polymer per pound of catalyst will be obtained). These latter effects are not observed to the same degree when an acid is added to an already-formed reaction mixture.

In the preferred procedure involving the preparation of an aged catalyst concentrate (i.e. preparing the catalyst in from 2 to 50% of the normal amount of solvent or diluent) which is then diluted before use, the concentration of each catalyst ingredient should usually be in the range of, from about 10 to about 300 millimoles per liter of solvent (mM./liter), and the concentration of acid in the aging solution should be roughly proportionate to the catalyst concentration. For example, in a catalyst to be utilized at a level of 6 mM./liter of diisobutyl aluminum chloride and 3 mM./liter of titanium tetrachloride, the catalyst aging solution will usually contain 100 to 200 mM. per liter of solvent of each catalyst ingredient and 800 to 2000 p.p.m. of an acid such as stearic acid. This solution is then diluted down to an effective Ti/Al concentration and stearic acid added thereto for a final acid concentration of about 200 p.p.m. These are minimum levels to prevent fouling of equipment when the benzene diluent contains 5 to 10 p.p.m. of water. Higher acid levels are required for wetter solvents.

When the final catalyst concentration is half the above figure (3/1.5) then the catalyst should be aged with about 500 p.p.m. and the final diluted solution should contain 100 p.p.m. of stearic acid, or equivalent. It has been determined that low catalyst levels of about 1.0:0.5 should be made employing 167 p.p.m. acid during aging and about 30–40 p.p.m. in the final reaction mixture. While still lower catalyst levels can be employed, especially when operating continuously, a minimum acid concentration of about 25 to 50 p.p.m. should be employed in the polymerization medium to guard against chance entry of moisture to the system. During continuous operations, wherein the solvent:diluent is freed of polymer and recycled, substantially anhydrous conditions are much more easily maintained, requiring markedly lower catalyst and carboxylic acid levels.

It has also been observed in the Ti/Al catalyst systems not employing the acid additive that polymer build-up and higher slurry viscosities are encountered when producing low melt index polymers (higher molecular weight). With a carboxylic acid present, particularly the higher fatty acids, very little polymer build-up is encountered and the reaction medium remains much more fluid in any melt index range. This is a very valuable result since it facilitates the production of a wide range of polymers ranging from the low molecular weight waxes through the highest molecular weight linear polymers.

With the systems described immediately above, so direct is the relationship between slurry viscosity and proper carboxylic acid concentration that slurry viscosity measurements can be employed as a sensitive control measure indicating when the concentration of fatty acid need be increased. Furthermore, slurry viscosity is also a clear tell-tale of the onset of polymer build-up. Continuous polymerizations of ethylene in benzene have been followed both by periodic slurry viscosity readings and by heat balance data with the result that it was observed that the heat transfer coefficient goes down dramatically (i.e. onset of serious build-up) at the same time that the slurry viscosity begins to go up. So good is the correlation that slurry viscosity values can be taken as a clear indication of the condition of the reaction vessel walls. When the acid is present in proper concentration, studies have shown that the heat transfer coefficient may fall off slightly in the first few hours of operation but it will then assume a steady, high value which can be maintained, apparently, almost indefinitely. The importance of these results to the development of commercially-feasible continuous processes cannot be overestimated. By the proper use of acid, the higher catalyst efficiency, the higher and more reliable reaction rates, the higher solids content made possible by reduced slurry viscosity, and the greatly reduced equipment "down-time" results in markedly lower equipment costs for a given-sized commercial plant and a considerably lower cost per pound of product.

The acid additive can be any carboxylic acid which is soluble in the particular hydrocarbon solvent-diluent material being employed and which contains at least 2 carbon atoms per molecule and no catalyst-reactive groups other than carboxyl. The acid need not be pure but may be any commercially-available grade or mixture of acids. Furthermore, the acid can be added in a partially or completely neutralized form such as any metal and amine salt. Illustrative acids found effective include acetic acid, propanoic acid, 2-ethylhexanoic acid, lauric acid, palmitic acid, stearic acid, benzoic acid, oxalic acid, phthalic acid, phthalic anhydride, acrylic acid, low molecular weight, soluble polyacrylic acid, ethylene diamine tetraacetic acid, rosin acid (abietic acid) and many others. Almost as effective are the partial salts or these and other acids. For example, the sodium, calcium, zinc, lead, and diethyl amine salts of stearic acid are as effective, on an equimolar basis, as stearic acid. Greatly preferred are the aliphatic mono-carboxylic acids containing from 2 to about 20 carbon atoms per molecule. Most preferred are aliphatic (fatty) monocarboxylic acids containing from about 10 to about 20 carbon atoms. The free acids are much preferred because they do not increase the metal contamination of the polymer.

The process of this invention is applicable to the polymerization of any mono-unsaturated hydrocarbon monomeric material containing ethylene which polymerizes with the precipitation of an insoluble polymer, that is, any such material containing a significant proportion of ethylene (i.e. at least about 10 mol percent ethylene). Thus, there may be polymerized ethylene itself, ethylene/propylene mixtures, mixtures of ethylene with 1-butene, 3-methyl-butene-1, 3-methyl-pentene-1, 4-methyl-hexene-1, 4,4-dimethyl-pentene-1, 1-pentene, 1-hexene, 1-octene, styrene, and others.

Particularly preferred is any mono-unsaturated hydrocarbon material containing at least 90 mol percent of ethylene. Best results are achieved with ethylene itself.

The process of this invention can be carried out in any hydrocarbon solvent or diluent in which the monomer and acid are soluble and which is sufficiently free of inhibitors. Thus there may be utilized propane, butane, hexane, heptane, "Deobase" (hydrogenated kerosine), cyclohexane, benzene, toluene, xylene, and others. The process is most effective with aromatic solvents, and particularly with benzene.

The process of this invention utilizes as a catalyst the titanium/aluminum organometallic type of catalyst made by combining, in the solvent or diluent, a titanium compound in which the titanium is at a valence of at least three with a hydrocarbon aluminum compound. Titanium compounds useful for this purpose include titanium halides (fluoride, chloride, bromide, and iodide), acetyl-acetonates, etc., alkyl titanium halides, alkyl titanium alkoxides, and many others. Particularly preferred are the titanium trihalides and tetrahalides including titanium trichloride, -trifluoride, -tribromide and triiodide, titanium tetrafluoride, titanium tetrachloride, titanium tetrabromide, and titanium tetraiodide. Best results are obtained with titanium tetrachloride.

The term "hydrocarbon aluminum compound" means any aluminum compound containing at least one hydrocarbon group attached to aluminum through a carbon atom. Illustrative compounds include trialkyl aluminum compounds such as triethyl aluminum, tri-n-butyl aluminum, tri-isobutyl aluminum, tri-octyl aluminum, tri-decyl aluminum, diethyl aluminum fluoride, diethyl aluminum chloride, diethyl aluminum bromide, diethyl aluminum iodide, diisobutyl aluminum fluoride, -chloride, -bromide and -iodide, ethyl aluminum difluoride, -dichloride, -dibromide, -diiodide, isobutyl aluminum dichloride, diisobutyl aluminum isobutoxide, and the like, triaralkyl aluminum compounds such as tri-styryl aluminum, triaryl aluminum compounds such as tri-phenyl aluminum, and many, many others.

Particularly preferred are the trialkyl aluminum compounds and the dialkyl aluminum halides. Most preferred are catalysts made from a titanium tetrahalide and a dialkyl aluminum halide.

The above definitions include catalysts made by generating one or more of the catalyst-forming ingredients in situ. For example, dialkyl aluminum halides can be made by combining a trialkyl aluminum and an aluminum trihalide.

The proportion of any of the catalysts to be utilized is conventional. In other words, the presence of the acid additive does not generally increase catalyst requirements. To the contrary, in most cases a slightly higher rate is obtained with the usual catalyst proportions, which higher rate can be easily accommodated in most reactors because of lower slurry viscosity, better agitation and higher heat transfer coefficients. With the Ti/Al organometallic catalysts from as little as about 0.2 millimole of titanium per liter (mM./l.) of reaction mixture to as high as about 20 millimoles per liter will usually be sufficient. In general, from as little as about 0.1 mol of aluminum for every 5 mols of titanium to as much as 10 or 20 mols of aluminum per mole of titanium (corresponding to Ti:Al molar ratios from 50:1 to 1:20) will be sufficient. With the most preferred titanium tetrachloride:dialkyl aluminum chloride catalysts the preferred Ti/Al molar ratios are between about 5:1 and 1:5. In terms of total catalyst, from about 0.1 to about 10% by weight of catalyst, based on the monomers, will usually be sufficient. Of course, when volatile monomers such as ethylene are added in the form of a vapor in a continuous or intermittent fashion, the actual catalyst concentration may be considerably higher due to very low monomer concentrations.

The reaction temperature may be anywhere in the range of from about −25° to 150° C., although temperatures of from about 20° to 95° C. will usually be better.

The process of the invention is carried out under an inert atmosphere in a sealed reaction vessel or system. This may be accomplished by combining the ingredients in any order under an atmosphere of nitrogen, helium, argon or hydrocarbon vapors. As indicated above, the procedure may be employed of combining a small amount of the hydrocarbon solvent or diluent with the catalyst ingredients and the carboxylic acid to prepare an "aged" or pre-mixed catalyst, diluting with additional solvent containing the acid additive, and then adding monomer. Conversely, the solvent, acid additive and monomer may be combined and the catalyst added thereto. Also, a liquid monomer, the fatty acid and solvent may be combined and added to the catalyst. A preferred procedure is to add the monomeric mixture in vapor form to a solvent:catalyst:acid mixture. A strongly preferred procedure involves the addition of separate streams of (1) a solvent:acid mixed solution, (2) monomer, and (3) a diluted, aged catalyst/acid solution to a reaction mixture while withdrawing, in a continuous or intermittent manner, a separate stream of reaction product. In the latter procedure the stream of reaction product is filtered and the filtrate mixed with acid and/or catalyst for return to the reaction vessel. Still other variations in procedure are possible.

In the examples the measure of polymer molecular weight and also of polymer flow behavior will be expressed as a "Flow Index." These values are determined at 190° C. by a modification of the standard "melt index" procedure (A.S.T.M. D1238–52T) wherein the pressure or weight on the plunger is double that of the above A.S.T.M. procedure. The polyethylenes prepared by the process of this invention are too hard and tough to yield meaningful values on the standard melt index scale.

The invention will now be more fully described with reference to several specific examples which are illustrative only.

*Example I*

An aged catalyst solution is prepared by combining 135 ml. of dry benzene containing 3 p.p.m. of water, 0.376 gram of stearic acid, 3.1 cc. of liquid diisobutyl aluminum chloride, and 0.9 cc. of TiCl$_4$, agitating gently for a few moments and then allowing to stand for three hours. Meanwhile a flask fitted with a stirrer, thermometer, condenser and gas inlet tube is dried thoroughly and then flushed with dry nitrogen. To the dry, nitrogen-filled flask there are added 2565 ml. of the same dry benzene and 1.43 grams of stearic acid. After the catalyst aging period is over the entire solution of catalyst is added to the flask, the stirrer started and ethylene gas is admitted through the dip tube while the flask is immersed in a water bath maintained at a suitable temperature (40–51° C.) to maintain a pot temperature of 50–55° C. After a four hour period of ethylene addition, the ethylene flow is cut off, 10% by volume of methanol added to the flask (color discharged) and the resulting mixture stirred for a few minutes before the flask is opened and the slurry-like reaction mixture filtered, the filter cake washed several times with pure methanol and then dried in a vacuum oven at 50° C. The product is a coarsely granular, pure white and high molecular weight polyethylene weighing 610 grams. Thus, the total solids content of the final slurry must have been in the neighborhood of 23%, yet the slurry still could be stirred by the small laboratory-type stirrer.

Close inspection of the inside surfaces of the reaction flask and the stirrer shaft reveals no film formation or polymer build-up below the liquid level. In contrast, a control run carried out under identical conditions except for no stearic acid during catalyst aging or in the polymerization charge produces a heavy continuous film layer with thicker areas of solid polyethylene build-up. Thinking that the build-up may be due to moisture in the system, runs duplicating that above, but exercising every care to exclude moisture, still produce film coatings on the reaction flasks and build-up on the stirrer. Catalysts used in these "dry-dry" runs were aged 1, 2 and 3 hours, all to no avail, since film formation and polymer build-up occur in all. All of these experiments result in slurries which are too thick to stir at 10–14% total solids.

The film-free flask used in the above example is utilized for six consecutive runs carried out with stearic acid under the same conditions. At the close of the series, the flask and stirrer are again examined and no traces of film formation or wall build-up are found. In these above experiments, the Ti/Al molar ratio is 3:6, the stearic acid concentration during aging was about 3160 p.p.m. and that present during the reaction was about 620 p.p.m.

*Example II*

In this example, catalysts identical to that of Example I are prepared except for using 670 p.p.m. of glacial acetic acid during catalyst aging and 135 p.p.m. of acetic acid in the reaction mixture. The resulting catalyst is observed to have a markedly smaller particle size. After 4 to 6 hours of ethylene addition a slurry containing over 19% total solids is obtained which is still stirrable at the end of the reaction. Over 552 grams of a dry, coarsely granular polyethylene are obtained. Close inspection of the reaction flask reveals no film formation or polymer build-up. Consecutive, repeated runs in the same flask, show no film or polymer build-up after a total of 6 runs. In further experiments, it is possible to reduce the acetic acid level in the reaction mixture to 33 p.p.m. without film formation.

*Example III*

In this experiment a catalyst is prepared by combining 68 ml. of benzene containing 200 p.p.m. of water, 1.6 ml. of diisobutyl aluminum chloride, and 0.45 ml. of TiCl$_4$, agitating mildly for a few moments and then allowing to stand for 3 hours at room temperature. 10 ml. of the aged catalyst solution and 200 ml. of benzene (water content adjusted to 40 p.p.m.) are combined and ethylene gas run in for an hour, the reaction mixture then discharged and another charge put in. This repeated charging and discharging without opening the reactor is an attempt to duplicate repeated use of comercial batch-style reactors. After six such repeated experiments the glass reactor and stirrer have a very heavy film on the surface below the liquid level.

When, however, the above series of six reactions are run with catalysts prepared in the presence of 1000 p.p.m. stearic acid and with 100 p.p.m. present in the polymerization mixture, no film formation or polymer build-up below the liquid level is observed. Repeated experiments employing 3:6 catalysts with 200 p.p.m. of stearic acid in the reaction mix show complete freedom from film formation. When the 1000 p.p.m. of stearic acid is omitted from the catalyst aging solution and 200 p.p.m. are added to the reaction mix, the result is the same although the reaction is somewhat slower. When the 1000 p.p.m. of stearic acid is present during aging, but no additional acid is added during dilution, film formation is again obtained in only a few consecutive charges. These charges, however, showed the activating influence of stearic acid. Thus, stearic acid can be added any time for the purpose of preventing film formation. The acid must be present during catalyst aging, however, to obtain maximum activation. These two effects of the carboxylic acid additive appear to be distinct.

*Example IV*

Experiments are conducted in which benzene solvent containing 0 p.p.m., 3 p.p.m., 5 p.p.m., and 113 p.p.m. of water is present. The procedure is that of Example III except that no water is intentionally added and no carboxylic acid is present during catalyst aging or in the reaction mixture during the reaction. The catalysts are aged for periods of 1, 2 and 3 hours in various of the series. These experiments utilize the same 3:6 TiCl₄/diisobutyl aluminum chloride catalyst as utilized in Examples I to III. In every case film formation is encountered, in some cases the polymer build-up being quite heavy, irrespective of moisture content. Also, slurry viscosities are quite high at 10 to 14% T.S. As a result of these tests it appears that film formation cannot be avoided by the use of anhydrous or very carefully controlled conditions.

*Example V*

In this experiment, still other acids are substituted for the stearic acid of the above examples, and in each case a series of 4 to 6 consecutive charges is carried out. The acids utilized are benzoic acid (1357 p.p.m. aging; 271 p.p.m. in reaction mix); acrylic acid (800 p.p.m. aging; 160 p.p.m. in reaction mix); lauric acid (2230 p.p.m. aging; 444 p.p.m. in reaction mix); oxalic acid (500 p.p.m. aging; 100 p.p.m. in reaction mix); and ethylene diamine tetraacetic acid (823 p.p.m. aging; 164 p.p.m. in reaction mix). In all cases film formation is very slight, the small amount of film observed being spotty, easily loosened and apparently readily soluble or dispersible in soapy water. In repeat experiments employing larger proportions of these acids, film formation is entirely suppressed.

*Example VI*

In this experiment several pilot plant scale runs are carried out in a continuous manner employing a phenolic-lined reaction vessel. One such run is without stearic acid and the second is with this additive. The procedure in both cases is to prepare the catalyst, dilute it and then add ethylene until it is necessary to begin periodic withdrawing of slurry to hold a desirable volume level. After each withdrawal of slurry, the liquid level is restored by periodic additions of benzene or benzene solution of stearic acid together with make-up catalyst. Both runs are conducted employing benzene of from 0 to 3 p.p.m. of water content. In both runs, the progress of the reaction is followed by determining slurry viscosity (before quench) utilizing a modified Brabender Viscometer and flow index values on the withdrawn slurries. Withdrawn slurry is conducted under nitrogen to a nitrogen-filled surge tank where it is blended with 5 to 10% of methanol to kill the catalyst, after which the slurry is filtered, washed with fresh methanol and dried.

In the first run without stearic acid, the catalyst level is 0.775 mM. of TiCl₄ and 1.55 mM. of diisobutyl aluminum chloride prepared with a two hour aging cycle. During the initial 30 hours of reaction the flow index values start out at 42 and drop to about 5. Meanwhile the slurry viscosity holds relatively steady at 50 to 70 cps. As the run continues the flow index of the polymer drops to 0.5 to 0.2 in 48 to 50 hours total time. Meanwhile the slurry viscosity rises dramatically to 300 to 400 cp. During this time the slurry total solids content does not vary appreciably. As the run continues for a total of 135 hours the flow index continues to fall to 0.08 to 0.003, the slurry viscosity meanwhile becoming so high as to be off scale on the viscometer. The falling flow index values indicate that control of reaction variables was not achieved, the water content and catalyst ratio being suspect. Ash content of the product is very low, values of 0.00 to 0.01% being recorded.

In the second run with stearic acid, the procedure and conditions are similar, except for the use of a 0.75/1.57 catalyst aged 2 hours in the presence of 200 p.p.m. of stearic acid with the reaction mixture adjusted at about 40 p.p.m. of stearic acid. During the first week of continuous operations the slurry viscosity holds contant at between 50 and 100 cp. while the flow index varies from 6.1 to 0.03. Towards the end of the run, after about 125 hours of operation when slurry viscosity was quite high, the level of stearic acid in the reaction mixture is increased to about 80 p.p.m. with a resulting considerable decrease in slurry viscosity to a manageable 280 cp. Six hours after increasing the acid level the viscosity is down to an easily-stirred 190 cp. After the increase in stearic acid, the addition of the latter is terminated with the result that the run has to be shut down because of plugging of the discharge valve. The ash content of the polyethylene during this run is also very low, typical samples showing zero ash by the usual ash/weight loss procedure.

Calculations made from heat balance data taken during both runs of Example VI show strikingly that increasing slurry viscosity is accompanied by wall build-up. In the run carried out without stearic acid, the heat transfer coefficient is initially about 65 B.t.u./ft.²/hr./° F. and that this value fell steadily to a low value of 33 after only 58 hours of operation, and a very low value of 24 at 135 hours. In contrast, the run with stearic acid starts out with a heat transfer coefficient of 140 and is still 33 after 184 hours. Because of operating difficulties, stearic acid addition is interrupted for a while at this point with the result that the coefficient fell to only 11. Upon resumption of stearic acid addition, the coefficient rose to 18 but further operational difficulties of a mechanical nature necessitated shut-down at this point.

Examination of the reaction vessel after each run reveals that fairly severe polymer build-up exists on most of the vessel walls and stirrer below the liquid level. However, the use of stearic acid nearly doubled the effective time between reactor cleaning, even though calculations showed that the stearic acid/water molar ratio was only 0.5 through most of the run. Catalyst efficiency with stearic acid is 284 lbs. of polyethylene per pound of catalyst as against about 150 to 190 lbs./lb. of catalyst for batchwise operation under controlled moisture conditions. The succeeding example demonstrates the use of still higher stearic acid/water ratios.

The heat transfer data of Example VI shows that there is a direct correlation between slurry viscosity and flow index and polymer build-up. Under closely-controlled conditions, easily- and speedily-obtained slurry viscosity readings can be utilized in a control test indicating polymer molecular weight and the condition of the reactor surfaces.

*Example VII*

The second experiment of the preceding example is repeated, except for higher catalyst and stearic acid levels. The catalyst is made up from 3 mM. of TiCl₄ and 6 mM. of diisobutyl aluminum chloride (per liter) with 1000 p.p.m. of stearic acid during aging (in 5% benzene containing not more than 7.5 p.p.m. of water). The water level in the reaction mixture is the same and the stearic acid level thereof is adjusted to 200 p.p.m. This run is conducted for a total of 93 hours when a rupture disc failed necessitating complete shutdown. However, during the first 30 hours the heat transfer coefficient is at 96 or above after which it falls to 56 in 24 hours (additional). Thereafter no change is detected for nearly 40 additional hours of operation. Again, when the heat transfer coefficient falls, slurry viscosity increases. Slurry viscosity values, however, remain at 50 to 70 cp. during the last 40 hours or more of operation. During the last 70 hours of reaction, the flow index of the polymer rose as high as 0.53 and fell to as low as 0.12 but held fairly steady at 0.23 to 0.50 for 80% of the time. Total solids content during this time held steady between 13 and 15%. The final dry product has an ash content of only 0.03%, even though the catalyst level was 4 times that of Example VI. This seems to indicate that the polymer is easier to clean up when using the acid additive.

After shutdown, no sign of polymer film formation or build-up could be detected below the liquid level. Had not the rupture disc failed, indications are that this run could have gone on almost indefinitely. Catalyst efficiency averaged nearly 300 lbs. per lb. of catalyst against a value of 100–200 for comparable runs without stearic acid. This experiment shows that stearic acid suppresses the effects of minor variations in reaction conditions (i.e., the system is less sensitive to such variations). The experiment also shows that when the stearic acid/water ratio is 1 or more polymer build-up and slurry viscosity are reduced to control.

When the preceding experiment is repeated, operation for 200, 300 or more hours is obtained with no necessity for shutdown. When pure, dry benzene of reproducible quality (oxygen-free and not more than about 10 p.p.m. of water) is utilized, the heat transfer coefficient remains at 80 to 100 permitting operation at the rate of 50 to 75 lbs. per hour (in the same equipment as in Examples VI and VII) as against a rate of 32 lbs./hour obtained in the first experiment of Example VI.

I claim:

1. The method of polymerizing ethylene comprising adding ethylene to a reaction mixture containing an aged catalyst prepared (1) by combining in an inert hydrocarbon diluent from about 10 to about 300 millimoles of a titanium tetrahalide per liter of said diluent and from about 10 to about 300 millimoles of an alkyl aluminum compound per liter of said diluent, the substances so combined being in a molar ratio Ti:Al between about 5:1 and about 1:5, from 0 to 10 parts/wt. of water per million parts by weight of said diluent, and 100 to 2,000 parts/wt. of a 2 to 20 carbon carboxylic acid free of catalyst reactive groups dissolved in said diluent, aging the resulting mixture for from about 1 to about 24 hours, and (2) diluting the resulting aged catalyst mixture with said diluent and said carboxylic acid to a total titanium and aluminum concentration of from about 1 to about 15 millimoles per liter, a water concentration of less than 50 parts/wt. per million parts/wt. of said diluent, and a concentration of said acid dissolved in said diluent of at least 50 parts/wt. per million parts/wt. of said diluent while maintaining in the resulting reaction mixture at least one mole of —COOH per mole of said water, and carrying out the polymerization of said ethylene in said reaction mixture at a temperature of from about 20° C. to 95° C.

2. The method as defined in claim 1 wherein the process is conducted in a continuous fashion by withdrawing a polymer-containing slurry while replacing the lost volume with a solution in said hydrocarbon of said fatty acid and make-up catalyst, the said solution containing sufficient fatty acid to maintain the molar ratio —COOH:water at a value of at least 1.

3. The method of polymerizing ethylene comprising the steps of (1) combining in benzene containing less than about 10 p.p.m. of water (a) from about 10 to about 300 mM./liter of benzene of a titanium tetrahalide, from about 10 to about 300 mM./liter of a dialkyl aluminum halide, and from about 100 to 2000 parts by weight per million parts of benzene of a 2 to 20 carbon atom carboxylic acid free of catalyst reactive groups and allowing the resulting mixture to age for from 1 to 24 hours, (2) diluting the solution of the preceding step with said benzene and said fatty acid to produce a reaction medium containing from about 0.2 to about 20 mM./liter of titanium, a Ti/Al molar ratio between about 5:1 and 1:5, and, at low levels of water in the above range, at least 25 parts by weight of said acid per million parts by weight of said benzene, and in all cases at least one mole of fatty acid per mole of water in said benzene, and (3) adding ethylene to said medium.

4. The method as defined in claim 3, further characterized by said titanium tetrahalide being titanium tetrachloride and said carboxylic acid being a higher fatty acid containing from 10 to 20 carbon atoms.

5. The method as defined in claim 3 wherein the said addition of ethylene to said medium and withdrawal of a finished slurry of polyethylene is carried out in a concurrent manner with lost volume being replaced by addition of additional catalyst and a make-up solution of said fatty acid in said benzene, the proportion of said fatty acid in said make-up solution being calculated to maintain the said fatty acid/water molar ratio of at least 1 in said medium.

References Cited in the file of this patent
UNITED STATES PATENTS

| | | |
|---|---|---|
| 2,843,577 | Friedlander et al. | July 15, 1958 |
| 2,868,772 | Ray et al. | Jan. 13, 1959 |
| 2,886,561 | Reynolds et al. | May 12, 1959 |
| 2,943,063 | Eby et al. | June 28, 1960 |
| 2,965,627 | Field et al. | Dec. 20, 1960 |

FOREIGN PATENTS

| | | |
|---|---|---|
| 1,022,382 | Germany | Jan. 9, 1958 |
| 534,792 | Belgium | Jan. 31, 1955 |